Sept. 25, 1923.
R. H. WHITESIDE
NUT LOCK
Filed Jan. 14, 1922
1,469,131
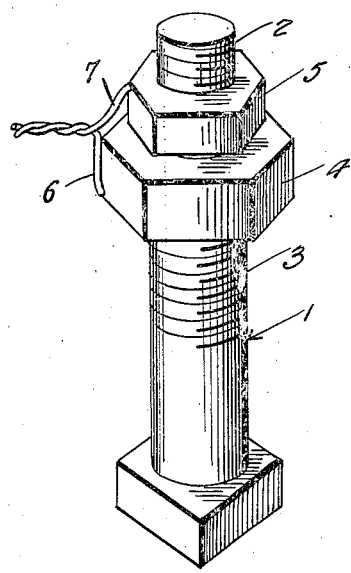
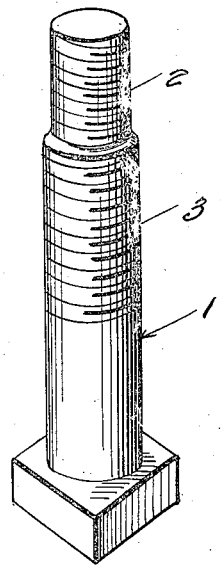
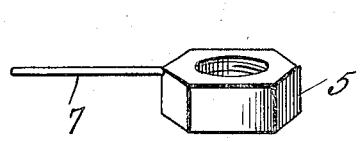
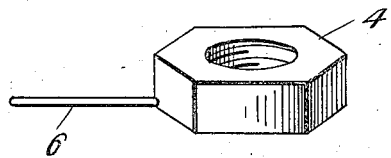
Inventor
R.H. Whiteside.
By
Attorney Patented Sept. 25, 1923.

1,469,131

UNITED STATES PATENT OFFICE.

ROBERT H. WHITESIDE, OF OAKLAND, CALIFORNIA.

NUT LOCK.

Application filed January 14, 1922. Serial No. 529,277.

*To all whom it may concern:*

Be it known that I, ROBERT H. WHITE-SIDE, a citizen of the United States, residing at Oakland, in the county of Alameda and State of California, have invented certain new and useful Improvements in Nut Locks; and I do hereby declare the following to be a full, clear, and exact description of the invention, such as will enable others skilled in the art to which it appertains to make and use the same.

The invention has relation to bolts and analogous fastening means embodying a threaded member and nuts mounted thereon and adapted to cooperate therewith for the securement of the part to be fastened.

The invention provides a fastening of the character aforesaid which precludes the loosening or displacement of the nut by jar, vibration or other cause usually tending to effect loosening and displacement of the nut.

In accordance with the present invention, the bolt or like part has an end portion reversely threaded, each part so threaded being adapted to receive a correspondingly threaded nut, the latter having formed therewith or attached thereto a wire whereby, when the nuts are properly positioned upon the bolt or like part, they are made secure by having the wires twisted together.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a reversely threaded bolt provided with correspondingly threaded nuts which are made secure in accordance with the present invention, Figure 2 is a detail view in perspective of the bolt, Figure 3 is a detail perspective view of one of the nuts, and Figure 4 is a detail in perspective of the companion nut.

Corresponding and like parts are referred to in the following description and designated in the several views of the drawings by like reference characters.

The numeral 1 designates a bolt or like member or part having an end portion reversely threaded, as indicated at 2 and 3. The terminal portion 2 is of less diameter than the part 3 to admit of unobstructed application of the nut to the threaded part 3 when assembling the parts. The part 3 is a righthand thread and the part 2 a lefthand thread.

The nut 4, adapted to screw upon the threaded portion 3, has its opening formed with a right thread. The nut 5, adapted to screw upon the part 2, has its opening formed with a left thread. The nut 4 is provided with a wire 6 which may be formed therewith or welded or secured thereto in any manner so as to form in effect a part thereof. The nut 5 is provided with a wire 7 which may likewise form a part thereof or be welded or attached thereto in any manner to practically form a part thereof.

In practice, the bolt part or member 1 may be applied to the work in any preferred way, after which the nut 4 is threaded thereon and when properly positioned, the nut 5 is threaded upon the part 2. After nut 5 has been adjusted to the required position, the two wires 6 and 7 are twisted together, thereby preventing relative movement or displacement of the nut because of the reverse screw threaded portions and the bond or tie between the nuts. If the nature of the work is such, it is not necessary to tighten either one of the nuts by means of a wrench or like tool, since when once positioned and the wires 6 and 7 twisted together, neither one of the nuts can move independently of the other and both must remain in the adjusted position.

What is claimed is:

1. A bolt having threaded portions of different diameters, the threads of the portions being reversed, cooperating nuts of different sizes to engage the threads of the bolt, each of the nuts having a wire permanently secured to it and extending therefrom, the wires of the nuts being flexible for tying together in order to prevent relative movement of the nuts and said wires being completely out of the zone of the surfaces of the nuts which face each other whereby shearing of the wires is avoided through movement of one nut relatively to the other.

2. In combination, a bolt, a plurality of nuts threaded thereon and one constituting a lock for the other, wires extending independently of each other and one from each nut, said wires being adapted for connection beyond the nuts and being completely out of the zone of the surfaces of the nuts which face each other, whereby shearing of the wires is avoided through movement of one nut relatively to the other nut.

In testimony whereof I affix my signature in presence of two witnesses.

ROBT. H. WHITESIDE.

Witnesses:
HOWARD VERNON,
J. HARRIS.